United States Patent
Kassubek et al.

(12)

(10) Patent No.: US 11,860,128 B2
(45) Date of Patent: Jan. 2, 2024

(54) SYSTEM FOR MEASURING AN INHOMOGENEITY OF A MEDIUM

(71) Applicant: ABB Schweiz AG, Baden (CH)

(72) Inventors: Frank Kassubek, Rheinfelden (DE); Miklos Lenner, Daettwil (CH); Stefano Marano, Zurich (CH); Gerrit Held, Oberrohrdorf (CH)

(73) Assignee: ABB Schweiz AG, Baden (CH)

( * ) Notice: Subject to any disclaimer, the term of this patent is extended or adjusted under 35 U.S.C. 154(b) by 456 days.

(21) Appl. No.: 17/093,666

(22) Filed: Nov. 10, 2020

(65) Prior Publication Data

US 2021/0140927 A1   May 13, 2021

(30) Foreign Application Priority Data

Nov. 13, 2019  (EP) .................................. 19208995

(51) Int. Cl.
*G01N 29/024* (2006.01)
*G01N 29/032* (2006.01)
(Continued)

(52) U.S. Cl.
CPC ......... *G01N 29/024* (2013.01); *G01N 29/032* (2013.01); *G01N 29/06* (2013.01);
(Continued)

(58) Field of Classification Search
CPC .... G01N 29/024; G01N 29/032; G01N 29/44; G01N 2291/011; G01N 2291/015;
(Continued)

(56) References Cited

U.S. PATENT DOCUMENTS

| | | |
|---|---|---|
| 4,135,387 A | 1/1979 | Benedict |
| 4,726,221 A | 2/1988 | Tavlarides et al. |
| (Continued) | | |

FOREIGN PATENT DOCUMENTS

| | | |
|---|---|---|
| CN | 102216738 A | 10/2011 |
| CN | 203178220 U | 9/2013 |
| (Continued) | | |

OTHER PUBLICATIONS

A.S. Dukhin et al, Acoustic and electroacoustic spectroscopy, Colloids and Surfaces A 173 (2000) 127.
(Continued)

*Primary Examiner* — Nathaniel T Woodward
*Assistant Examiner* — Rose M Miller
(74) *Attorney, Agent, or Firm* — Leydig, Voit & Mayer, Ltd.

(57) ABSTRACT

A measurement system for measuring an inhomogeneity of a medium in a vessel includes: a first ultrasound emitter for sending a first ultrasound signal along a first path; a second ultrasound emitter for sending a second ultrasound signal along a second path different from the first path; a first ultrasound receiver for receiving the first ultrasound signal and measuring a first measurement parameter p1 of the received first ultrasound signal; a second ultrasound receiver for receiving the second ultrasound signal and measuring a second measurement parameter p2 of the received second ultrasound signal; and a control unit: receives the first measurement parameter p1 from the first ultrasound receiver, receives the second measurement parameter p2 from the second ultrasound receiver, and determines a ratio p1/p2 of the first measurement parameter p1 to the second measurement parameter p2.

9 Claims, 4 Drawing Sheets

(51) Int. Cl.
*G01N 29/44* (2006.01)
*G01N 29/06* (2006.01)
*G01N 29/34* (2006.01)

(52) U.S. Cl.
CPC .......... *G01N 29/341* (2013.01); *G01N 29/44* (2013.01); *G01N 2291/011* (2013.01); *G01N 2291/015* (2013.01); *G01N 2291/021* (2013.01); *G01N 2291/022* (2013.01); *G01N 2291/025* (2013.01); *G01N 2291/02818* (2013.01); *G01N 2291/02881* (2013.01)

(58) Field of Classification Search
CPC .......... G01N 2291/02818; G01N 2291/02881; G01N 29/06; G01N 29/341; G01N 2291/021; G01N 2291/022; G01N 2291/025
USPC .......................................................... 73/597
See application file for complete search history.

(56) References Cited

U.S. PATENT DOCUMENTS

| | | | |
|---|---|---|---|
| 4,770,042 | A | 9/1988 | Cobb |
| 5,627,323 | A | 5/1997 | Stern |
| 6,436,326 | B1 | 8/2002 | Keillor, III |
| 7,080,556 | B2 | 7/2006 | Jen et al. |
| 7,107,851 | B2 * | 9/2006 | Owen .................. G01N 29/449 702/54 |
| 10,260,929 | B2 | 4/2019 | Kassubek et al. |
| 2004/0037742 | A1 | 2/2004 | Jen et al. |
| 2006/0027015 | A1 * | 2/2006 | Tavlarides .......... G01N 29/032 73/61.75 |
| 2009/0158821 | A1 | 6/2009 | Sun et al. |
| 2011/0083503 | A1 | 4/2011 | Iverson et al. |
| 2021/0140864 | A1 * | 5/2021 | Held ........................ G01N 9/26 |

FOREIGN PATENT DOCUMENTS

| | | |
|---|---|---|
| CN | 106338317 A | 1/2017 |
| CN | 106338320 A | 1/2017 |
| CN | 107748273 A | 3/2018 |
| CN | 108008022 A | 5/2018 |
| CN | 110425068 A | 11/2019 |
| DE | 19633558 A1 | 2/1998 |
| DE | 10117958 A1 | 10/2002 |
| DE | 102008014300 A1 | 9/2009 |
| DE | 102011115691 A1 * | 4/2013 ............ G01N 11/00 |
| DE | 102015117441 A1 | 4/2017 |
| EP | 1196239 A1 | 4/2002 |
| JP | S59218947 A | 12/1984 |
| SU | 789734 A1 * | 12/1980 |
| WO | WO 9015988 A1 | 12/1990 |
| WO | WO 02071050 A1 | 9/2002 |

OTHER PUBLICATIONS

Bhardwaj, A. et al, Application of advanced non-contact ultrasound for composite material qualification, (2014) CAMX 2014—Composites and Advanced Materials.

L.J. Bond et al, Ultrasonic methods for the online real-time characterization of state mixing. In Proc. 16"th ICA and 135th Meeting Acoustical Society of America, ed. P.K. Kuhl, L.A. Crum, 1161-2 (1998).

B. Voleisiene et al, Ultrasound velocity measurements in liquid media, Ultragarsas (ultrasound), vol. 63. No. 4, 2008.

Pyl'nov, Y.V. et al, Ultrasonic tomography of nonmixing fluid flows, (2015) Physics of Wave Phenomena, 23 (4), pp. 273-278.

Yucel, U. et al, Ultrasonic characterisation of lactose dissolution, (2010) Journal of Food Engineering, 98 (1), pp. 28-33.

Prassianakis, I.N., Moduli of elasticity evaluation using ultrasound, (1997) insight: Non-Destructive Testing and Condition Monitoring, 39 (6), pp. 425-429.

Juliette Pierre et al, A technique for measuring velocity and attenuation of ultrasound in liquid foams. Ultrasonics, Elsevier, 2013, 53, pp. 622-629.

W.N. Cobb, Non-intrusive, ultrasonic measurement of fluid composition, in: Review of Progress in Quantitative Nondestructive Evaluation. vol. 18, Ed. Thompson and Chimenti, Kluwer Academic/Plenum Publishers, 1999.

Nacef Ghodhbani et al, Ultrasound monitoring of the cure kinetics of an epoxy resin: Identification, frequency and temperature dependence. Polymer Testing, Elsevier, 2016, 56, pp. 156-166.

Aubin, J. et al, Current methods for characterising mixing and flow in microchannels, (2010) Chemical Engineering Science, 65 (6), pp. 2065-2093.

M.S. Greenwood et al, On-line ultrasonic density sensor for process control of liquids and slurries, Ultrasonics 37 (1999) 159-171.

L.J. Bond et al, Ultrasonic technologies for advanced process monitoring, measurement, and control, IMTC 2003 (2003), 1288.

P. Hauptmann et al, Application of ultrasonic sensors in the process industry, Meas. Sci. Technol. 13 (2002) R73.

J.A. Bamberger et al, Using ultrasonic attenuation to monitor slurry mixing in real time, Ultrasonics 42 (2004) 145.

* cited by examiner

SYSTEM FOR MEASURING AN INHOMOGENEITY OF A MEDIUM

CROSS-REFERENCE TO PRIOR APPLICATION

Priority is claimed to European Patent Application No. EP 19 208 995.1, filed on Nov. 13, 2019, the entire disclosure of which is hereby incorporated by reference herein.

FIELD

The present invention relates to a measurement system and a method for measuring an inhomogeneity of a medium in a vessel, a control unit, a program element, a computer readable medium, and to the use of such a measurement system.

BACKGROUND

Detection of the homogeneity of a material inside an enclosure is important for many processes in the industry as, for example, mixing of substances (e.g. two-phase fluids, emulsions, solid-liquid mixtures, foams, etc.), melting processes, chemical reaction monitoring, curing of polymers or cement etc. For many of these processes there are specific sensor systems being able to detect the physical properties of the material, e.g. grain size or ratio of the different phases.

For non-invasive measurements with respect to a material inside an enclosure, measurements based on ultrasound may be used to analyze relative content and droplet size in emulsions based on the attenuation of the signal. The analysis includes complex models to predict the dependence of attenuation on the system properties. Some systems use the scattering of the ultrasound signal from particles, e.g. bubbles, to determine the two-phase properties and concentrations in the mixing context. Ultrasound tomography uses multiple transducers and typically also attenuation and scattering of the signal for spatially resolving different regions with different material properties.

SUMMARY

In an embodiment, the present invention provides a measurement system for measuring an inhomogeneity of a medium in a vessel, comprising: a first ultrasound emitter configured to send a first ultrasound signal along a first path; a second ultrasound emitter configured to send a second ultrasound signal along a second path different from the first path; a first ultrasound receiver configured to receive the first ultrasound signal and to measure a first measurement parameter p1 of the received first ultrasound signal; a second ultrasound receiver configured to receive the second ultrasound signal and to measure a second measurement parameter p2 of the received second ultrasound signal; and a control unit configured to: receive the first measurement parameter p1 from the first ultrasound receiver, receive the second measurement parameter p2 from the second ultrasound receiver, determine a ratio p1/p2 of the first measurement parameter p1 to the second measurement parameter p2, compare the ratio p1/p2 with a ratio h/D of a distance h covered by the first ultrasound signal along the first path to a distance D covered by the second ultrasound signal along the second path, and control a process based on a comparison of the ratio p1/p2 with the ratio h/D.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

Figure 1:
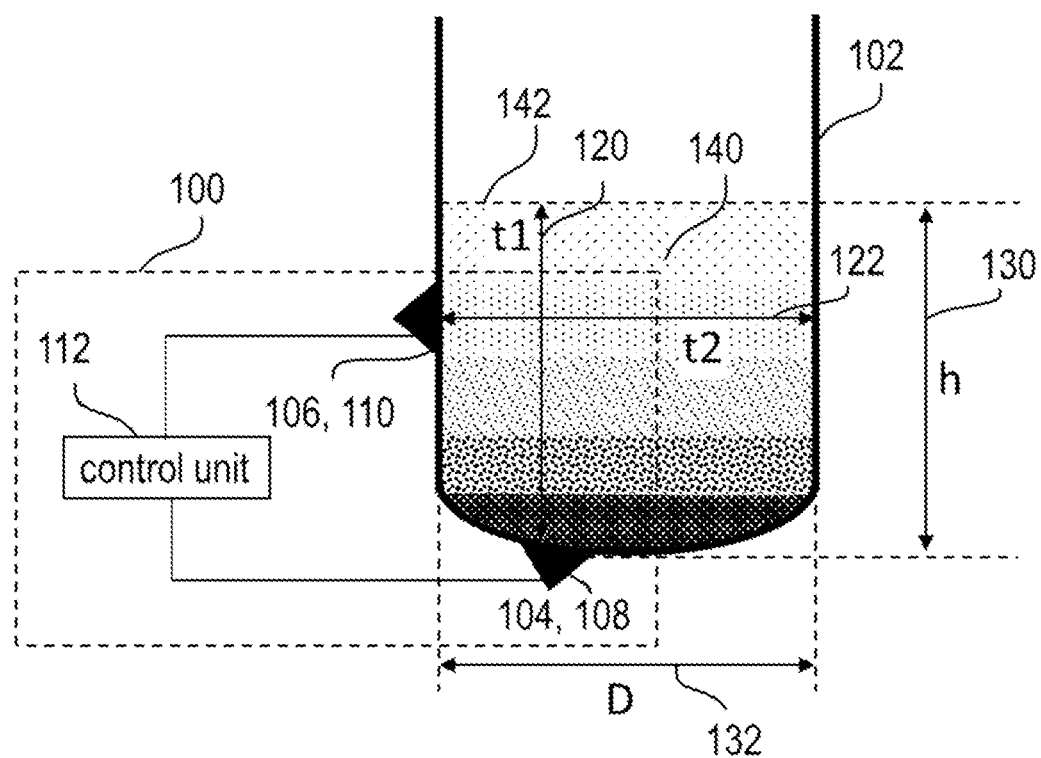
FIG. 1 shows a diagram of measurement system with a measurement arrangement according to an embodiment.

In an embodiment, the present invention provides, for controlling a process relying on the knowledge of the inhomogeneity status of a liquid medium in a vessel, a system and a method that allows to determine the inhomogeneity of a medium in a simple, robust, and cost-effective way.

The described embodiments similarly pertain to the method for measuring an inhomogeneity of a medium, the measurement system, the control unit, the use of the measurement system, the computer program element and the computer-readable medium. Synergetic effects may arise from different combinations of the embodiments although they might not be described in detail.

Further on, it shall be noted that all embodiments of the present invention concerning a method, might be carried out with the order of the steps as described, nevertheless this has not to be the only and essential order of the steps of the method. The herein presented methods can be carried out with another order of the disclosed steps without departing from the respective method embodiment, unless explicitly mentioned to the contrary hereinafter.

Technical terms are used by their common sense. If a specific meaning is conveyed to certain terms, definitions of terms will be given in the following in the context of which the terms are used.

In this disclosure, the terms "ultrasound emitter" and "ultrasound receiver" are used. If no distinction between emitter and receiver is necessary, also the more general terms "sensor" or "transducer" are used. Sensors or transducers may be devices that emit and/or receive ultrasound signals.

According to a first aspect, a measurement system for measuring an inhomogeneity of a medium in a vessel is provided. The system comprises a first ultrasound emitter configured to send a first ultrasound signal along a first path, a second ultrasound emitter configured to send a second ultrasound signal along a second path different from the first path, a first ultrasound receiver to receive the first ultrasound signal sent by the first ultrasound emitter, and to measure a first measurement parameter p1 of the received first ultrasound signal, a second ultrasound receiver to receive the second ultrasound signal sent by the second ultrasound emitter, and to measure a second measurement parameter p2 of the received second ultrasound signal. The measurement system further comprises a control unit, which is configured to receive the first measurement parameter p1 from the first ultrasound receiver, receive the second measurement parameter p2 from the second ultrasound receiver, determine the ratio p1/p2 of the first measurement parameter p1 to the second measurement parameter p2, compare the ratio p1/p2 with a ratio h/D of a distance h covered by the first ultrasound signal along the first path to the distance D covered by the second ultrasound signal along the second path. The control unit is further configured to control a process, e.g. a mixing process or a chemical process, based on the comparison of the ratio p1/p2 with the ratio h/D.

The non-invasive measurement system allows thus to measure the homogeneity of the medium with only few measurements and only few mathematical operations by using one reproducible quantity. The distances h and D may be known from the known specifications of the vessel, e.g., the diameter of the vessel, known co-ordinates of the positions of the ultrasound transducers or sensors, respectively, or a known level height in case that the signal is reflected at the surface of the medium. Advantageously, the ratio h/D may be determined by a calibration measurement, which is performed using a homogeneous medium. If h/D does not change from one measurement to another, e.g. if they depend only on fixed vessel and geometry data, the ratio h/D may be stored in a non-volatile memory. Otherwise, e.g., when h depends on a level height that may vary from one measurement to another, the calibration may be performed as needed.

It is to be noted, that "a second path" means, that the system may comprise also a third path. Generally, n different paths may be provided.

According to an embodiment, the control unit is further configured to determine a comparison value based on the ratio p1/p2 and the ratio h/D and to control a process, as for example a mixing process, if the comparison value or a suitable measure characterizing the deviation of the two values is above a predetermined threshold. The process may be continued if the comparison value is above the threshold. If the comparison value is equal or below the threshold, the mixing process may be considered to be finished and may thus be stopped. The comparison value may be determined, for example, by subtracting p1/p2 from h/D, e.g., diff=p1/p2−h/D, or by determining a value k the ratio in t1/t2=k*h/D, and comparing k to 1. If k=1, the velocities of sound along the two paths are equal. The threshold may then be compared to diff or to k.

If the distances D and h are constant, also their relation h/D is constant. In this case, instead of comparing p1/p2 and h/D, the difference between p1/p2 of a measurement and a subsequent measurement may be determined and compared to a threshold. This means that in this case, h and D have not to be known. However, due to the flat, asymptotic curve, this variant is not as accurate as the comparison with respect to h/D.

The control unit has preferably a calculating unit. For example, the calculating unit calculates the ratios p1/p2 and h/D, subtracts the ratios from each other, and compares the absolute value of the subtraction with a configurable threshold. If the value is smaller than the threshold, the control unit may stop the process, e.g., a mixing process, and indicate this event, for example optically, acoustically, or by sending a signal to a server that is connected to the control unit. Alternatively, the control unit sends the measurement data to, e.g., a central server that performs the calculations so that the control unit can be kept simple and at low costs. Such an arrangement may be useful when, for example, a large number of processes has to be performed in parallel.

Thus, the control unit is responsible for starting, performing, and stopping the measurements, and eventually for communication and indication. Further, it may control the process itself, i.e. the controlling of the motor that drives, e.g., the rotating blades.

"Controlling a process" in this context may be, for example, controlling a mixing process with respect to a phase change in the medium, or a temperature difference, or a chemical reaction. Controlling a process implies also the monitoring of the corresponding parameters, as for example the inhomogeneity status, the temperature differences, etc.

A material has some specific characteristics with respect to ultrasound, as for example velocity and attenuation. The velocity in turn is temperature dependent, so that the times of flight are indicative of inhomogeneity and of temperature differences.

Therefore, the following parameters are usable as measurement parameters.

According to an embodiment, the first measurement parameter p1 is a first time of flight t1 in the medium, and the second parameter p2 is a second time of flight t2 in the medium. Since the velocity of the ultrasound waves depend on the material and the temperature of the medium, the temperature should preferably be equal in the tank or vessel when measuring the inhomogeneity. Vice versa, when measuring temperature differences, the medium should be in a homogeneous state. The term "time of flight" relates to the time of flight in the medium and is used in this sense in the present disclosure. Other effects, e.g., the time needed for the signal to pass through the wall of the vessel and runtimes inside the sensors have to be taken into account in the measurement, i.e., for example, have to be subtracted from the measurement value.

The first emitter and the second emitter may be included in one single transducer or in different transducers. Similarly, the first receiver and the second receiver may be included in one single transducer or in different transducers. Further, any combination thereof may be possible. Especially, in an example, the first and the second emitter, and the first and the second receiver are integrated in one single transducer. Furthermore, different signals and paths may be realized by different excitation modes of the ultrasound waves and/or frequencies.

According to a further embodiment, the first measurement parameter p1 is a first attenuation a1 of the ultrasound signal related to the emitted and the received first ultrasound signal, and the second parameter p2 is a second attenuation a2 of the second ultrasound signal related to the emitted and the received second ultrasound signal. The attenuation therefore may be defined as the ratio of the excitation voltage amplitude to the received voltage amplitude. The attenuation is experienced by the ultrasound when hitting transitions from one substance of the medium to a further substance or one of the further substances, respectively. Here again, it may be necessary to subtract the attenuation in the transducer and the vessel wall to correct the measured values.

According to an embodiment, the control unit is further configured to monitor and control a chemical reaction, a phase change in the medium, a mixing process, and/or a temperature difference of the medium. Further, it can be used for heating or cooling the medium at different locations, which may be important for chemical reactions. It may further be used for adaptation of the process time, e.g., in diffusive processes, etc. For that, the control unit may, for example, drive the motor at a higher or a lower rotation speed, dependent on the requirements, such as processing time. The controlling of, e.g. the rotation speed, may be supported by a feedback loop. The feedback loop may comprise data or signals from further sensors. For example, a further ultrasound sensor may be used to monitor the distances h or D. Further sensors may monitor the temperature, pressure or other parameters.

According to an embodiment, the first path is a path in vertical direction and the second path is a path in horizontal direction. Other directions and additional measurements in these or other directions are possible. In the case of a vertical and horizontal direction, the emitter and the receiver of one of these directions can be co-located, i.e., they may be arranged at the same position, e.g. in the same housing using the same piezo (same transducer is used) or different piezos (same transducer, but different emitter/receiver).

Therefore, according to an embodiment, the first ultrasound emitter and the first ultrasound receiver are co-located, and the first ultrasound signal is reflected at the wall of the surface of the medium. Further, the second emitter and the second receiver are co-located, and the second ultrasound signal is reflected at the wall of the vessel.

The evaluation can be generalized to a larger number of sound paths along the same or further directions.

In one example, instead of measuring the time-of-flight between two transducers, two sensors may be arranged at further locations, opposite of each other.

The first sensor emits the ultrasound signal. If a first time of flight is measured by the second sensor between the first and second sensor, and a second time of flight of the echo of the reflected pulses is measured by the first sensor, the propagation times in the transducer and the wall can be eliminated.

According to a second aspect, as explained further above, the described measurement system is used to determine temperature differences in the medium, density differences, and/or sedimentation. The system therefore further allows for quantifying, e.g. sedimentation or temperature differences which also lead to different times of flight of the two beams. Furthermore, the system is capable of measuring the composition, temperature, grain size or other information by analyzing the response signal in a usual way, e.g. using one of the sound paths.

According to a third aspect, a usage of a measurement system for monitoring and controlling a chemical reaction, a phase change in the medium, a mixing process, and/or a temperature difference in a vessel as described above is provided. Some examples for controlling a process are given in the description above.

According to a fourth aspect, a method for measuring an inhomogeneity of a medium in a vessel is provided, wherein measurement parameters of a first and a second ultrasound signal running through a medium inside a vessel are measured. In a first step, a first measurement parameter p1 of the first ultrasound signal along a first path is measured. In a second step, a second measurement parameter p2 of the second ultrasound signal along a second path different from the first path is measured. In a third step, the ratio p1/p2 of the first measurement parameter p1 to the second measurement parameter p2 of the second ultrasound signal is determined. In a fourth step, the ratio h/D of a distance h covered by the first ultrasound signal along the first path to the distance D covered by the second ultrasound signal along the second path is determined. In a fifth step, the ratio p1/p2 is compared with the ratio h/D, and in a last step a process is controlled based on the comparison of the ratio p1/p2 with the ratio h/D. The comparison of the ratio p1/p2 with the ratio h/D may further comprise determining the difference between or the ratio of the ratio p1/p2 and the ratio h/D, and comparing the difference or the ratio to a threshold. Further embodiments of the method correspond to the measurement system described above.

The proposed method does not require specific system properties as an input as, for example material properties of the vessel or the vessel content.

According to a further aspect, a control unit is provided. The control unit is configured to receive a first measurement parameter p1 from a first ultrasound receiver detecting a first ultrasound signal, which has been travelling along a first path, to receive a second measurement parameter p2 from a second ultrasound receiver detecting a second ultrasound signal, which has been travelling along a second path different from the first path, to determine the ratio p1/p2 of the first measurement parameter p1 to the second measurement parameter p2, to determine the ratio h/D of a distance h covered by the first ultrasound signal along the first path to the distance D covered by the second ultrasound signal along the second path, to compare the ratio p1/p2 with the ratio h/D and to control a process based on the comparison of the ratio p1/p2 with the ratio h/D.

According to a further aspect, a program element is provided which when being executed by the processor of a measurement system instructs the measurement system to perform the steps of the method described above.

According to a further aspect, a computer readable medium is provided on which the program element is stored.

The computer program element may be part of a computer program, but it can also be an entire program by itself. For example the computer program element may be used to update an already existing computer program to get to the present invention.

The computer readable medium may be a storage medium, such as for example, a USB stick, a CD, a DVD, a data storage device, a hard disk, or any other medium on which a program element as described above can be stored.

These and other features, aspects and advantages of the present invention will become better understood with reference to the accompanying figures and the following description.

The figures are described in detail in the following. In the examples, the system is explained using time-of-flight as measurement parameter.

FIG. 1 shows a measurement system 100 according to an embodiment. The measurement system 100 is arranged at a tank or vessel 102 which encloses a medium 140. For purpose of illustration, the medium 140 is drawn in FIG. 1 to be more dense at the bottom of the tank 102 and less dense near the surface representing an inhomogeneity with different speeds of sound. The measurement system 100 comprises a first ultrasound emitter 104 which is co-located with the first ultrasound receiver 108, a second ultrasound emitter 106 which is co-located with the second ultrasound receiver 110, and a control unit 112. The control unit 112 is connected to the ultrasound receivers 106, 110 and emitters 104, 106. The control unit 112 controls the measurement, for example, by giving a signal to the emitters 104, 108 to emit an ultrasound signal, e.g., in form of one or several short pulses. Emitter 104 emits a first signal in a first path 120 in a vertical direction, which is reflected at the surface 142 of the medium 140 in the vessel 102. The reflected ultrasound signal is detected by the receiver 108, which provides the measured time-of-flight t1 of the signal to the control unit 112. Note that also chirps in frequency can be used and comparison between emitted and received signal frequency allows to determine the time of flight. The measurement may be supported by, e.g., timestamps indicating the exact emitting and receiving time. The timestamps may be inserted into the data stream, or a message, which is sent from the emitter/receiver pair 104, 108 to the control unit 112. Similarly, the emitter/receiver pair 106, 110 measures the time-of-flight t2 of a second ultrasound signal in a second path 122 in a horizontal direction. The distances D 132 and h 130 may be known, e.g., from manufacturing data of the tank, from other measurements, as for example, time of flight measurements with a homogeneous medium, or from the filling process when filling the medium into the tank.

Due to the exemplary density gradient of the substances to be mixed, the velocity of the ultrasound signal in the horizontal direction is constant while the velocity of the first signal in the vertical direction is increasing with height. The effect of different velocities applies to any inhomogeneous mixture or density distribution and is not restricted to the density distribution shown in FIG. 1. It has to be noted that the velocity is an average along the path, so that it may happen in some density distributions that the average in one direction is by chance the same as the average in the other direction. To determine an inhomogeneity in such a case, either further paths may be introduced, or a time dependent variation may be detected.

Figure 2:
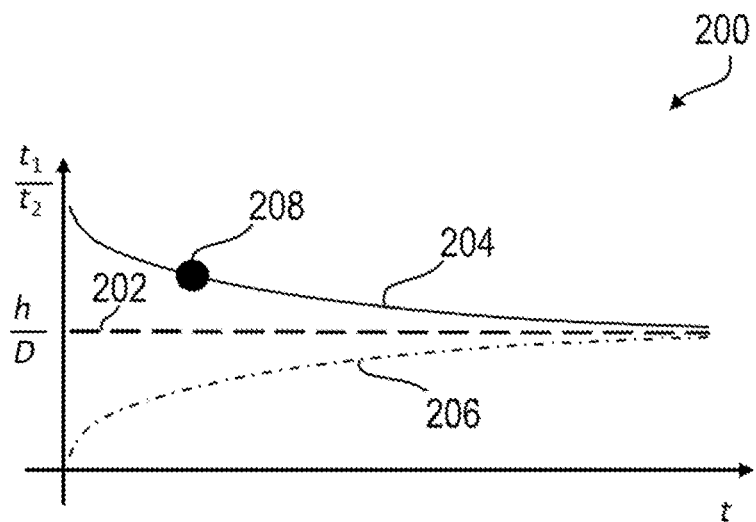
FIG. 2 shows a diagram illustrating the inhomogeneity during a mixing process over time.

FIG. 2 shows a diagram illustrating the development of the inhomogeneity during a mixing process over time. If the substances would be perfectly mixed, the velocity of the ultrasound signal would be equal in each direction, so that the ratio t1/t2 is equal to the ratio h/D resulting in a single value, represented by line 202. If, however, the substances are distributed, e.g., as shown in the example of FIG. 1, the velocities in one direction would differ from the velocity in the other direction, so that the time of flight-ratio for a measurement would not correspond to the ratio h/D, resulting, e.g. in point 208 in FIG. 2. The more the medium gets homogeneous during the mixing process, the more t1/t2 approaches the constant ratio h/D, which is a asymptote for t1/t2.

Therefore, there is no need to determine a fluctuating quantity as, for example, variance, but only the ratios t1/t2 and h/D, which simplifies the evaluation. Furthermore, no temporal variation is measured. Also, in the case of oscillations, single values deviating from the absolute h/D-constant indicate an inhomogeneity, so that no long time series for statistical evaluation have to be performed. For example, the difference between t1/t2 and h/D can be monitored in a configurable window comprising a few single difference values, in which the probability to detect a value indicating that an inhomogeneity is nearly 100%.

Figure 3:
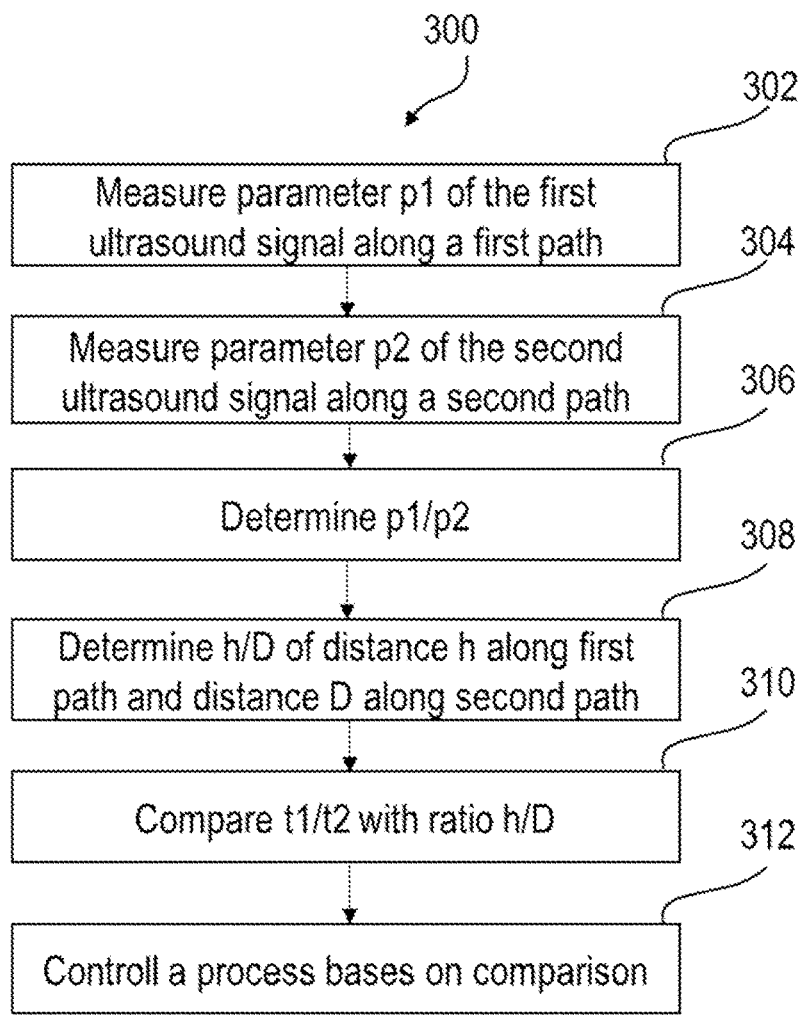
FIG. 3 shows a flow diagram of method for measuring an inhomogeneity of a medium.

FIG. 3 shows a flow diagram 300 of the method for measuring an inhomogeneity of a medium. Measurement parameters of a first and a second ultrasound signal running through a medium inside a vessel are measured, comprising the following steps: In 302, a first measurement parameter p1 of the first ultrasound signal along a first path is measured. In 304, a second measurement parameter p2 of the second ultrasound signal along a second path different from the first path is measured. In 306, the ratio p1/p2 of the first measurement parameter p1 to the second measurement parameter p2 of the second ultrasound signal is determined. In 308, the ratio h/D of a distance h covered by the first ultrasound signal along the first path to the distance D covered by the second ultrasound signal along the second path is determined. This determination may be obtained, for example, by a measurement or by retrieving the ratio h/D or the values h and D from a memory. In 310, the ratio t1/t2 is compared with the ratio h/D. Finally, in 312, a process is controlled based on the comparison of the ratio t1/t2 with the ratio h/D.

If the corresponding path lengths are unknown, the change of the propagation time ratio t1/t2 during the process can also be considered as a measure for inhomogeneity. The method may also be applied using the attenuation of the amplitude instead of the time of flight.

Figure 4:
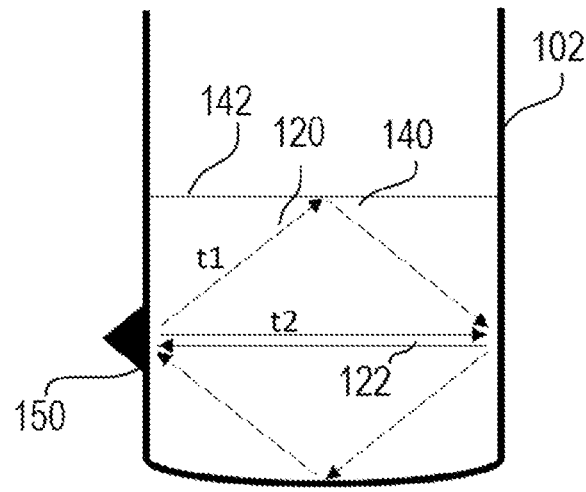
FIG. 4 shows a diagram of a first variant of the measurement arrangement.

FIG. 4 shows a diagram of a first variant of the measurement arrangement depicted in FIG. 1, with a single transducer 150 comprising two emitters and two receivers. Transducer 150 emits a first signal, which travels along a first path 120. The signal is reflected at the surface 142 of the medium 140, the wall of the vessel 102, and the bottom of the vessel. Finally, the transducer 150 receives the first signal again. Furthermore, transducer 150 emits a second signal, which travels along a second path 122. The signal is reflected back at the wall at a point opposite of the transducer and received by transducer 150 again.

Figure 5:
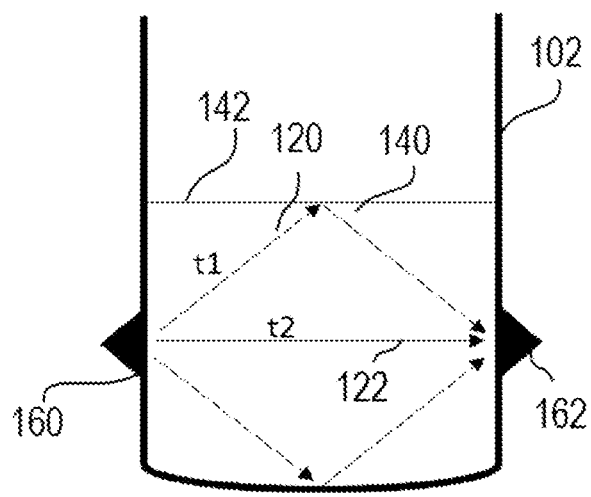
FIG. 5 shows a diagram of a second variant of the measurement arrangement.

FIG. 5 shows a diagram of a second variant of the measurement arrangement depicted in FIG. 1, with two transducers 160 and 162. Transducer 160 comprises two emitters and transducer 162 comprises two receivers. The first signal is emitted by transducer 160 along a path to the receiving transducer 162. The second signal is emitted by transducer 160 along a path to the bottom of the vessel 102, where it is reflected such that it arrives at transducer 162.

Figure 6:
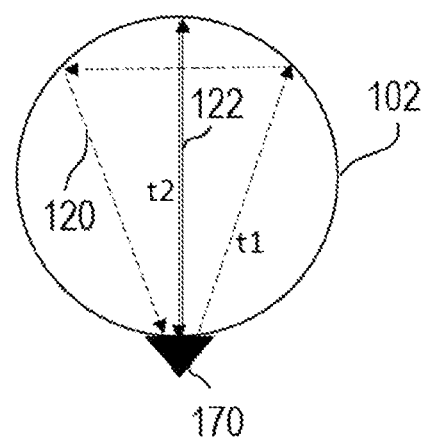
FIG. 6 shows a diagram of a third variant of the measurement arrangement.

FIG. 6 shows a diagram of a third variant of the measurement arrangement depicted in FIG. 1 with a single transducer 170. In this example, two different paths 120 and 122 are realized in a horizontal plane. Each of the two signals is reflected at the wall of the vessel 102, and arrives again at transducer 170, which receives the signal again.

The measurement arrangements in the examples show that many variants, i.e. also many further variants are possible. It is clear, that instead of two different paths, any number of different paths may be realized. In case of more than two paths, a more accurate image of the distribution of the substances of the medium and a more reliable determination, whether the medium is homogeneous or not, can be obtained.

Other variations to the disclosed embodiments can be understood and effected by those skilled in the art in practicing the claimed invention, from the study of the drawings, the disclosure, and the appended claims. In the claims the word "comprising" does not exclude other elements or steps and the indefinite article "a" or "an" does not exclude a plurality. A single processor or other unit may fulfill the functions of several items or steps recited in the claims. The mere fact that certain measures are recited in mutually different dependent claims does not indicate that a combination of these measures cannot be used to advantage. A computer program may be stored/distributed on a suitable medium such as an optical storage medium or a solid-state medium supplied together with or as part of other hardware, but may also be distributed in other forms, such as via the Internet or other wired or wireless telecommunication systems. Any reference signs in the claims should not be construed as limiting the scope of the claims.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A measurement system for measuring an inhomogeneity of a medium in a vessel, comprising:
    a first ultrasound emitter configured to send a first ultrasound signal along a first path;
    a second ultrasound emitter configured to send a second ultrasound signal along a second path different from the first path;
    a first ultrasound receiver configured to receive the first ultrasound signal and to measure a first measurement parameter p1 of the received first ultrasound signal;
    a second ultrasound receiver configured to receive the second ultrasound signal and to measure a second measurement parameter p2 of the received second ultrasound signal; and
    a control unit configured to:
        receive the first measurement parameter p1 from the first ultrasound receiver,
        receive the second measurement parameter p2 from the second ultrasound receiver,
        determine a ratio p1/p2 of the first measurement parameter p1 to the second measurement parameter p2,
        compare the ratio p1/p2 with a ratio h/D of a distance h covered by the first ultrasound signal along the first path to a distance D covered by the second ultrasound signal along the second path, and
        control a process based on a comparison of the ratio p1/p2 with the ratio h/D.

2. The measurement system according to claim 1, wherein the control unit is configured to determine a comparison value based on the ratio p1/p2 and the ratio h/D and to control a process if the comparison value is above a predetermined threshold.

3. The measurement system according to claim 1, wherein the first measurement parameter p1 is a first time of flight t1 and the second parameter p2 is a second time of flight t2.

4. The measurement system according to claim 1, wherein the first measurement parameter p1 is a first attenuation a1 of the emitted and received first ultrasound signal, and the second parameter p2 is a second attenuation a2 of the emitted and received second ultrasound signal.

5. The measurement system according to claim 1, wherein the control unit is configured to monitor and control a chemical reaction, a phase change in the medium, a mixing process, and/or a temperature difference of the medium.

6. The measurement system according to claim 1, wherein the first path is a path in a vertical direction orthogonal to a surface of the medium and the second path is a path in a horizontal direction orthogonal to a wall of the vessel.

7. The measurement system according to claim 6, wherein the first ultrasound emitter and the first ultrasound receiver are co-located and the first ultrasound signal is reflected at the surface of the medium, and
    wherein the second ultrasound emitter and the second ultrasound receiver are co-located and the second ultrasound signal is reflected at the wall of the vessel.

8. A control unit, wherein the control unit is configured to:
    receive a first measurement parameter p1 from a first ultrasound receiver detecting a first ultrasound signal, which has been travelling along a first path;
    receive a second measurement parameter p2 from a second ultrasound receiver detecting a second ultrasound signal, which has been travelling along a second direction;
    determine a ratio p1/p2 of the first measurement parameter p1 to the second measurement parameter p2;
    determine a ratio h/D of a distance h covered by the first ultrasound signal in the first direction to a distance D covered by the second ultrasound signal in the second direction;
    compare a ratio p1/p2 with the ratio h/D; and
    control a process based on a comparison of the ratio p1/p2 with the ratio h/D.

9. The measurement system according to claim 1, further comprising a non-transitory computer-readable medium having processor-executable instructions stored thereon, wherein the processor-executable instructions, when executed by one or more processors, facilitate performance of a method for measuring an inhomogeneity of the medium in the vessel in which measurement parameters of the first and the second ultrasound signal running through the medium inside the vessel are measured, the method comprising the steps of:
    measuring the first measurement parameter p1 of the first ultrasound signal along the first path;
    measuring the second measurement parameter p2 of the second ultrasound signal along the second path;
    determining the ratio p1/p2 of the first measurement parameter p1 to the second measurement parameter p2 of the second ultrasound signal;
    determining the ratio h/D of the distance h covered by the first ultrasound signal along the first path to the distance D covered by the second ultrasound signal along the first path;
    comparing the ratio p1/p2 with the ratio h/D; and
    controlling a process based on the comparison of the ratio p1/p2 with the ratio h/D.

* * * * *